United States Patent [19]
Hong et al.

[11] Patent Number: 6,141,208
[45] Date of Patent: Oct. 31, 2000

[54] HINGE DEVICE FOR A PORTABLE COMPUTER

[75] Inventors: Sung-Chen Hong; Yu-Fang Ku; Ji-Liang Jeng, all of Taipei, Taiwan

[73] Assignee: Compal Electronics, Inc., Taipei, Taiwan

[21] Appl. No.: 09/201,906

[22] Filed: Nov. 30, 1998

[51] Int. Cl.[7] ....................................................... G06F 1/16
[52] U.S. Cl. .......................... 361/681; 361/683; 361/679
[58] Field of Search .................................. 345/173, 179; 361/680, 681; 341/22

[56] References Cited

U.S. PATENT DOCUMENTS 5,617,301   4/1997   Sato et al. ............................... 361/796
5,702,197   12/1997   Chen ......................................... 403/166

Primary Examiner—Leo P. Picard
Assistant Examiner—Yean-Hsi Chang
Attorney, Agent, or Firm—Pillsbury Madison & Sutro Intellectual Property Group

[57] ABSTRACT

A hinge device is used in a portable computer having a main computer housing and a display panel with different size specifications. The hinge device includes a pivot retainer, a mounting block, and a pair of screw members. The mounting block is secured on the main computer housing at a line that forms a distance with the rotary axis of the pivot retainer, the distance corresponding to the difference in the size specifications of the main computer housing and the display panel to prevent interference when moving the display panel between open and closed positions relative to the main computer housing.

3 Claims, 3 Drawing Sheets

HINGE DEVICE FOR A PORTABLE COMPUTER

BACKGROUND OF THE INVENTION

1. Field of the Invention

The invention relates to a hinge device for a portable computer, more particularly to a hinge device for a portable computer having a main computer housing and a display panel with different size specifications.

2. Description of the Related Art

A hinge device is used in a portable computer to mount pivotally a display panel on a main computer housing. Referring to FIG. 1, the conventional hinge device comprises a pivot retainer 14, a mounting projection 16 and a pair of screw members 26. The pivot retainer 14 includes a fixed member 141 with a first section mounted securely on a lower end of the display panel 10, and a second section, and an elongate rotary member 142 that defines a longitudinal axis. The rotary member 142 has a first section coupled rotatably to the second section of the fixed member 141 such that the rotary member 142 is rotatable relative to the fixed member 141 about the longitudinal axis, and a second section formed with a pair of through holes 18 and an engaging hole 20 disposed between the through holes 18 along the longitudinal axis. The mounting projection 16 is fixed on top of an upper rear portion of the main computer housing 12. The mounting projection 16 has a top side formed with a pair of threaded holes 22 registered with the through holes 18 in the second section of the rotary member 142, and a stub 24 disposed between the threaded holes 22. The screw members 26 extend through the through holes 18 and engage threadedly the threaded holes 22 to mount the second section of the rotary member 142 on the mounting projection 16. The stub 24 on the top side of the mounting projection 16 engages the engaging hole 20.

The aforesaid hinge device is applied to a portable computer having a main computer housing and a display panel with the same size specifications. When it is necessary for the user to upgrade the function of the portable computer, that is, by installing a display panel with a larger size specification as compared to the main computer housing, use of the conventional hinge device results in interference between the main computer housing and the display panel, thereby windering opening and closing movement of the display panel relative to the main computer housing.

SUMMARY OF THE INVENTION

Therefore, the main object of the present invention is to provide a hinge device for a portable computer having a main computer housing and a display panel with different size specifications.

According to this invention, a hinge device is adapted for use with a portable computer having a main computer housing and a display panel with different size specifications. The hinge device comprises a pivot retainer, a mounting block and a pair of screw members. The pivot retainer includes a fixed member with a first section adapted to be mounted securely on a lower end of the display panel, and a second section, and an elongate rotary member that defines a longitudinal axis. The rotary member has a first section coupled rotatably to the second section of the fixed member such that the rotary member is rotatable relative to the fixed member about the longitudinal axis, and a second section formed with a pair of first through holes along the longitudinal axis. The mounting block includes an elongate base plate portion adapted to be disposed on top of an upper rear portion of the main computer housing. The base plate portion is formed with a pair of second through holes adapted for extension of fasteners therethrough so as to permit mounting of the mounting block on the main computer housing. The second through holes are disposed on a first longitudinal line. The mounting block further includes a mounting projection that projects upwardly from the base plate portion and that is disposed between the second through holes. The mounting projection has a top side formed with a pair of threaded holes registered with the first through holes in the second section of the rotary member. The threaded holes are disposed on a second longitudinal line parallel to the first longitudinal line. The first and second longitudinal lines form a predetermined distance in a direction transverse to the first and second longitudinal lines. The predetermined distance corresponds to the difference in the size specifications of the main computer housing and the display panel. The screw members extend through the first through holes and engage threadedly the threaded holes to mount the second section of the rotary member on the mounting projection of the mounting block.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
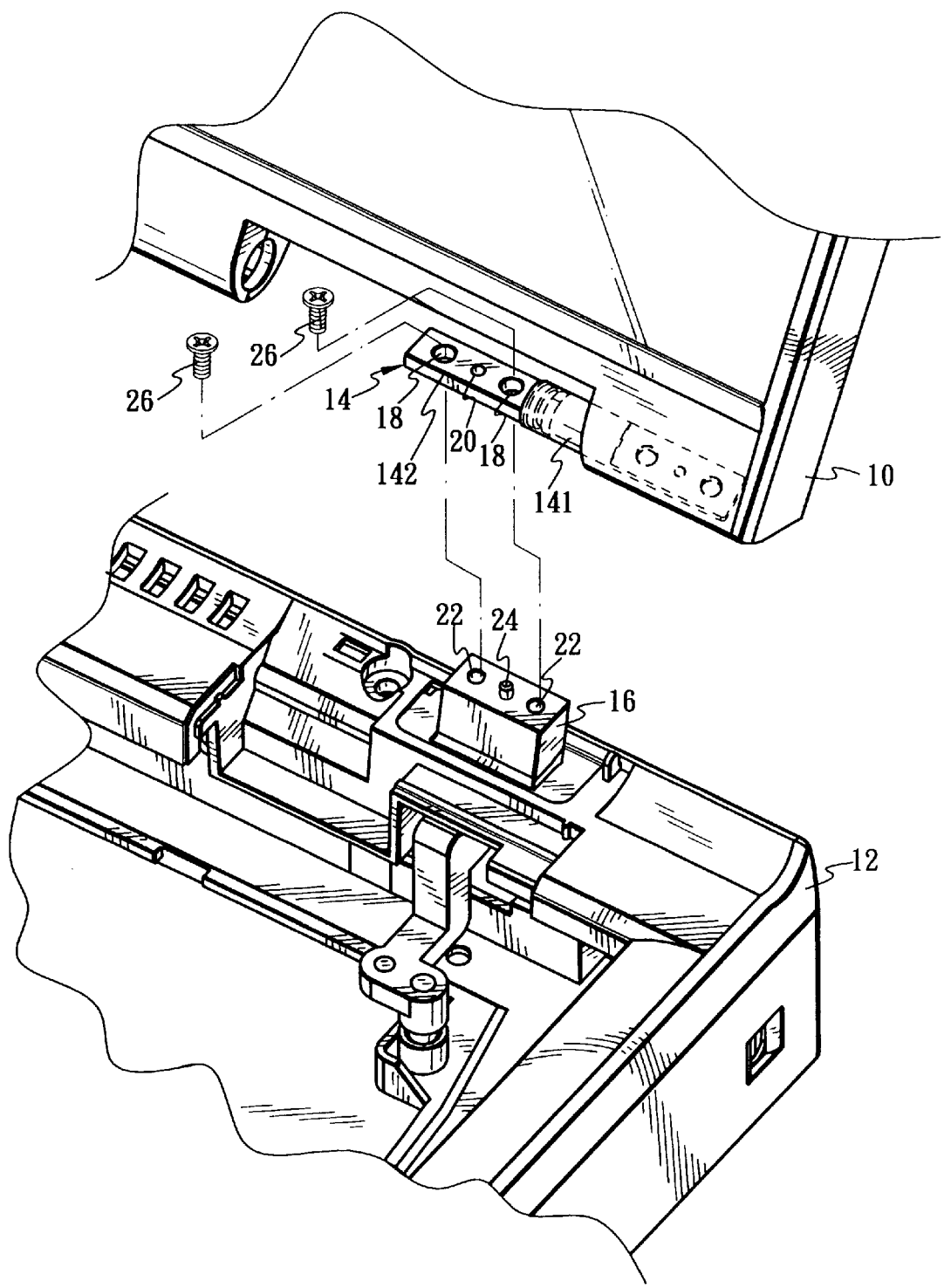
FIG. 1 is a fragmentary exploded perspective view showing a conventional hinge device on a portable computer.
Figure 2:
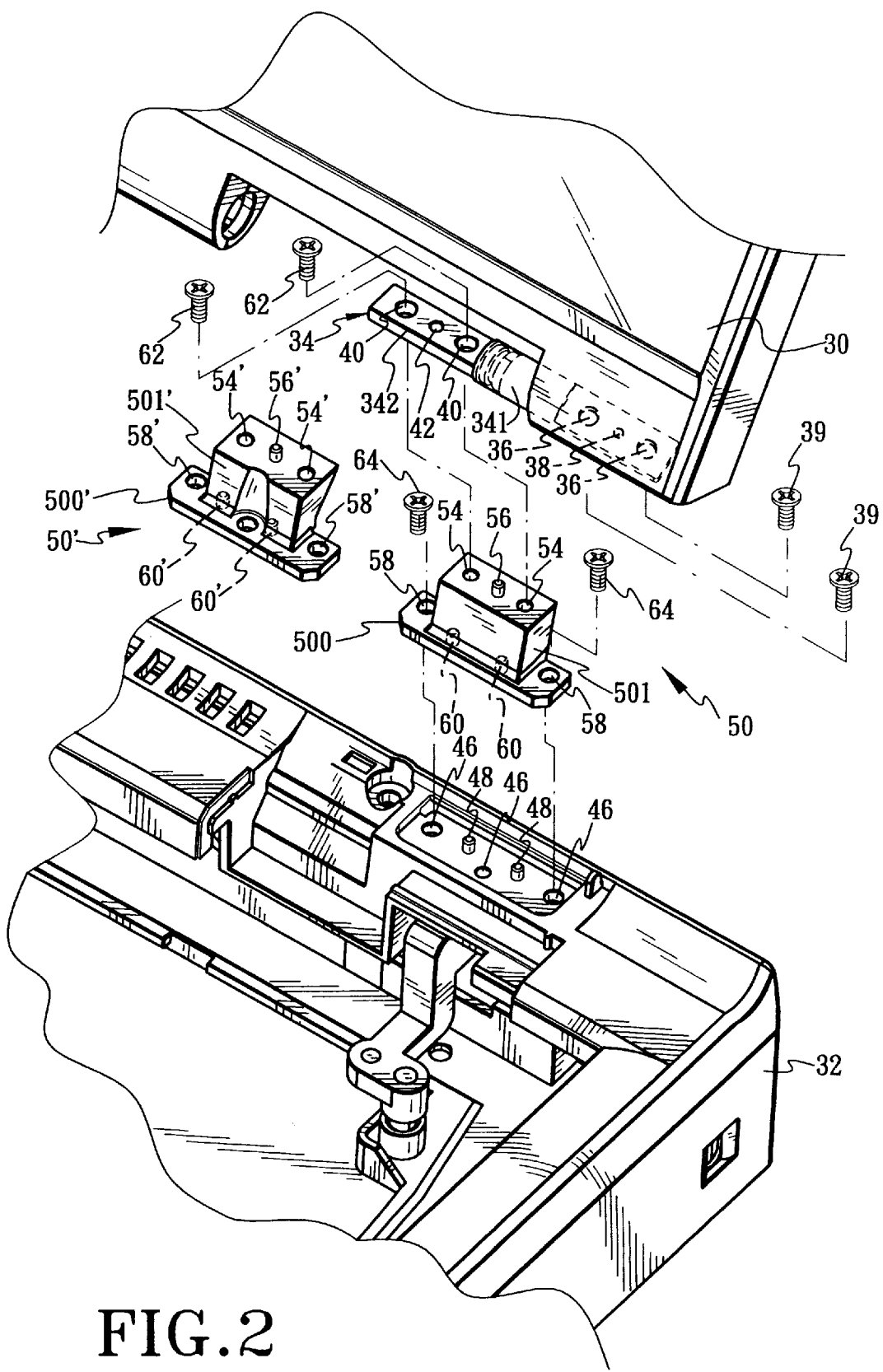
FIG. 2 is a fragmentary, exploded, and perspective view showing the preferred embodiment of a hinge device of this invention on a portable computer.
Figure 3:
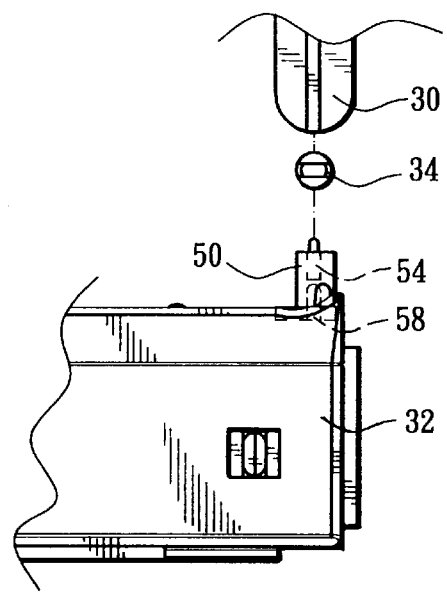
FIGS. 3 and 4 are fragmentary exploded schematic views showing a hinge device of the preferred embodiment of this invention on a portable computer.

Referring to FIG. 2, according to the preferred embodiment of this invention, a hinge device for a portable computer having a main computer housing 32 and a display panel 30 with the same size specifications is shown to include a pivot retainer 34, a mounting block 50, and two pairs of screw members 62 and 64. The pivot retainer 34 includes a fixed member 341 with a first section formed with two through holes 36 and a positioning hole 38 adapted to be mounted securely on a lower end of the display panel 30 by means of two screws 39, and a second section, and an elongate rotary member 342 that defines a longitudinal axis. The rotary member 342 has a first section coupled rotatably to the second section of the fixed member 341 such that the rotary member 342 is rotatable relative to the fixed member 341 about the longitudinal axis, and a second section formed with a pair of first through holes 40 and a first engaging hole 42 disposed between the first through holes 40 along the longitudinal axis. The mounting block 50 includes an elongate base plate portion 500 adapted to be disposed on top of an upper rear portion of the main computer housing 32. The base plate portion 500 is formed with a pair of second through holes 58 adapted for extension of the screw members 64 therethrough so as to permit mounting of the mounting block 50 on the main computer housing 32. The second through holes 58 are disposed on a first longitudinal line. The mounting block 50 further includes a mounting projection 501 that projects upwardly from the base plate portion 500 and that is disposed between the second through holes 58. The mounting projection 501 has a top side formed with a pair of first threaded holes 54 registered with the first through holes 40 in the second section of the rotary member 342 and a stub 56 disposed between the first threaded holes 54. The first threaded holes 54 are aligned with the second through holes 58, as shown in FIG. 3. The screw members 62 extend through the first through holes 40 and engage threadedly the first threaded holes 54 to mount the second section of the rotary member 342 on the mounting projection 501 of the mounting block 50. The stub 56 is formed on the top side of the mounting projection 501 to engage the engaging hole 42. The stub 56 and engaging hole 42 form a plug-and-hole unit to reinforce engagement between the mounting projection 501 and the rotary member 342. The screw members 64 extend through the second through holes 58 and engage threadedly a pair of second threaded holes 46 formed in the upper rear portion of the main computer housing 32, thereby mounting the base plate portion 500 of the mounting block 50 on the main computer housing 32. A pair of stubs 48 are formed on the upper rear portion of the main computer housing 32 and are disposed between the second threaded holes 46 to engage a pair of engaging holes 60 in the bottom side of the base plate portion 500 of the mounting block 50.

Figure 4:
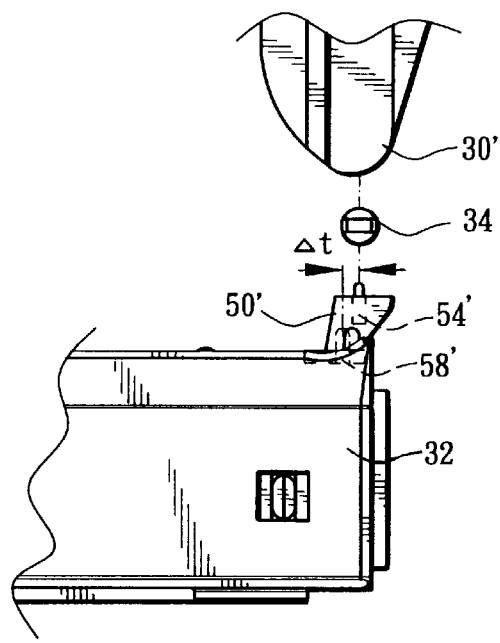

When it is desired to upgrade the portable computer by installing a display panel 30' with a size specification that differs from the main computer housing 32, the mounting block 50 is replaced by a mounting block 50', as shown in FIG. 4.

The mounting block 50' includes an elongate base plate portion 500' adapted to be disposed on top of the upper rear portion of the main computer housing 32. The base plate portion is formed with a pair of second through holes 58' adapted for extension of the screw members 64 therethrough so as to permit mounting of the mounting block 50' on the main computer housing 32. The second through holes 58' are disposed on a first longitudinal line. The mounting block 50' further includes a mounting projection 501' that projects upwardly from the base plate portion 500' and that is disposed between the second through holes 58'. The mounting projection 501' has a top side formed with a pair of first threaded holes 54' registered with the first through holes 40 in the second section of the rotary member 342 and a stub 56' disposed between the first threaded holes 54'. The first threaded holes 54' are disposed on a second longitudinal line parallel to the first longitudinal line. As shown in FIG. 4, the first and second longitudinal lines form a distance Δt in a direction transverse to the first and second longitudinal lines. The distance Δt corresponds to the difference in the size specifications of the main computer housing and the display panel. As such when the hinge device is attached to the portable computer, the rotary axis of the pivot retainer is shifted relative to the main computer housing so as to prevent interference when moving the display panel between open and closed positions relative to the main computer housing.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A hinge device for a portable computer, said portable computer having a main computer housing and a display panel with different size specifications, said hinge device comprising:

a pivot retainer comprising
 a fixed member with
  a first section adapted to be mounted securely on a lower end of the display panel,
  a second section, and
  an elongate rotary member that defines a longitudinal axis, said rotary member having a first section coupled rotatably to said second section of said fixed member such that said rotary member is rotatable relative to said fixed member about the longitudinal axis, and a second section formed with a pair of first through holes along the longitudinal axis;

a mounting block comprising
 an elongate base plate portion adapted to be disposed on top of an upper rear portion of the main computer housing, said base plate portion being formed with a pair of second through holes adapted for extension of fasteners therethrough so as to permit mounting of said mounting block on said main computer housing, said second through holes being disposed on a first longitudinal line,
 said mounting block further comprising a mounting projection that projects upwardly from said base plate portion and that is disposed between said second through holes, said mounting projection having a top side formed with a pair of threaded holes registered with said first through holes in said second section of said rotary member, said threaded holes being disposed on a second longitudinal line parallel to the first longitudinal line, the first and second longitudinal lines forming a predetermined distance in a direction transverse to the first and second longitudinal lines, the predetermined distance corresponding to difference in the size specifications of the main computer housing and the display panel; and a pair of screw members extending through said first through holes and threadedly engaging said threaded holes to mount said second section of said rotary member on said mounting projection of said mounting block;

wherein said rotary member of said pivot retainer and said mounting projection of said mounting block are formed with a plug-and-hole unit to reinforce engagement therebetween.

2. The hinge device according to claim 1, wherein said plug-and-hole unit includes an engaging hole formed in said second section of said rotary member, and a stub formed on said top side of said mounting projection to engage said engaging hole.

3. The hinge device according to claim 2, wherein said engaging hole is disposed between said first through holes, and said stub is disposed between said threaded holes.

* * * * *